(12) United States Patent
Kalo

(10) Patent No.: US 10,508,058 B2
(45) Date of Patent: Dec. 17, 2019

(54) HEAT-PERMEABLE TUBE CONTAINING CERAMIC MATRIX COMPOSITE

(71) Applicant: BASF SE, Ludwigshafen am Rhein (DE)

(72) Inventor: Benedikt Kalo, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/766,933

(22) PCT Filed: Oct. 4, 2016

(86) PCT No.: PCT/EP2016/073614
§ 371 (c)(1),
(2) Date: Apr. 9, 2018

(87) PCT Pub. No.: WO2017/063911
PCT Pub. Date: Apr. 20, 2017

(65) Prior Publication Data
US 2019/0062224 A1 Feb. 28, 2019

(30) Foreign Application Priority Data
Oct. 14, 2015 (EP) .................................. 15189756

(51) Int. Cl.
*C04B 37/02* (2006.01)
*F27B 7/28* (2006.01)
(Continued)

(52) U.S. Cl.
CPC .............. *C04B 37/02* (2013.01); *C01G 53/44* (2013.01); *F27B 7/28* (2013.01); *F27D 1/0009* (2013.01);
(Continued)

(58) Field of Classification Search
CPC . C04B 37/02; C01G 53/44; F27B 7/28; F27D 1/0013; F27D 1/10; H01M 4/505; H01M 4/525
See application file for complete search history.

(56) References Cited

U.S. PATENT DOCUMENTS

| 4,932,863 A | 6/1990 | Anderson |
| 5,261,555 A | 11/1993 | Rogers et al. |
(Continued)

FOREIGN PATENT DOCUMENTS

| CN | 201242344 Y | 5/2009 |
| CN | 203501745 U | 3/2014 |
(Continued)

OTHER PUBLICATIONS

Extended European Search Report dated Mar. 16, 2016 in European Patent Application No. 15189756.8 (with English translation of Category of Cited Documents), 3 pages.
(Continued)

*Primary Examiner* — Melvin C. Mayes
*Assistant Examiner* — Michael Forrest
(74) *Attorney, Agent, or Firm* — Oblon, McClelland, Maier & Neustadt, L.L.P.

(57) ABSTRACT

The present invention relates to a heat-permeable tube which has a double-walled construction. The material of the interior wall contains ceramic matrix composite. The material of the exterior wall contains metal. The present invention further relates to the use of this tube in a rotary tube furnace and the use of the rotary tube furnace for thermal treatment of materials. Furthermore, the invention relates to the use of a single-walled tube containing ceramic matrix composite as rotary tube.

14 Claims, 1 Drawing Sheet

(51) Int. Cl.
*F27D 1/00* (2006.01)
*F27D 1/10* (2006.01)
*C01G 53/00* (2006.01)
*H01M 4/505* (2010.01)
*H01M 4/525* (2010.01)

(52) U.S. Cl.
CPC ............ *F27D 1/0013* (2013.01); *F27D 1/10* (2013.01); *H01M 4/505* (2013.01); *H01M 4/525* (2013.01); *C01P 2006/40* (2013.01); *C04B 2237/38* (2013.01); *C04B 2237/405* (2013.01); *C04B 2237/406* (2013.01); *C04B 2237/704* (2013.01); *C04B 2237/706* (2013.01); *C04B 2237/84* (2013.01)

(56) References Cited

U.S. PATENT DOCUMENTS

| | | | |
|---|---|---|---|
| 5,261,943 | A | 11/1993 | Friedrichs et al. |
| 5,314,171 | A | 5/1994 | Friedrichs et al. |
| 6,733,907 | B2 | 5/2004 | Morrison et al. |
| 8,377,412 | B2 | 2/2013 | Malcus et al. |
| 8,980,475 | B2 | 3/2015 | Schroedle et al. |
| 8,992,794 | B2 | 3/2015 | Petrovic et al. |
| 2009/0101658 | A1 | 4/2009 | Maile et al. |
| 2012/0003128 | A1 | 1/2012 | His et al. |
| 2013/0329515 | A1* | 12/2013 | Katakura ............... F27B 7/14 366/144 |
| 2015/0078505 | A1 | 3/2015 | Xu et al. |
| 2015/0290885 | A1 | 10/2015 | Weiss et al. |

FOREIGN PATENT DOCUMENTS

| | | | |
|---|---|---|---|
| CN | 203501747 U | | 3/2014 |
| CN | 203927100 U | | 11/2014 |
| CN | 104562191 A | | 4/2015 |
| DE | 198 26 792 C2 | | 12/1999 |
| DE | 102006038713 A1 | | 11/2007 |
| DE | 102012219870 A1 | | 5/2014 |
| EP | 0 118 249 A2 | | 9/1984 |
| EP | 1 645 410 A2 | | 4/2005 |
| EP | 2351139 B1 | | 10/2013 |
| EP | 2696406 A1 | | 2/2014 |
| JP | 2001349675 A * | 12/2001 | ............... C23C 4/08 |
| WO | WO 2012/177833 A2 | | 12/2012 |
| WO | WO 2014/067706 A1 | | 5/2014 |
| WO | WO 2014/180686 A1 | | 11/2014 |
| WO | WO 2016/083185 A1 | | 6/2016 |

OTHER PUBLICATIONS

International Search Report dated Dec. 15, 2016, in PCT/EP2016/073614, filed Oct. 4, 2016.

\* cited by examiner

HEAT-PERMEABLE TUBE CONTAINING CERAMIC MATRIX COMPOSITE

The present invention relates to a tube which has an at least double-walled construction, wherein the material of the interior wall comprises ceramic matrix composite and the material of the exterior wall comprises metal and the at least double-walled tube wall has a ratio of thermal conductivity and wall thickness (heat transfer coefficient) at 800° C. of >50 W/(m²·K). The present invention further relates to the use of this tube in a rotary tube furnace and the use of the rotary tube furnace for the thermal treatment of materials. Furthermore, the invention relates to the use of a single-walled or at least double-walled tube comprising ceramic matrix composite as rotary tube.

The increasing demands in respect of purity and homogeneity of starting materials, for example for use in the electronic and medical sector, represent a great challenge for the production of these materials.

In many production methods, one stage of the process is the thermal treatment of the materials at temperatures of greater than 500° C. The thermal treatment of these materials is carried out in inexpensive rotary tube furnaces in many processes, e.g. in the production of cement, clinker, but also fertilizers, pigments and catalysts.

In principle, a distinction is made between two types of rotary tube furnaces: directly heated rotary tube furnaces and indirectly heated rotary tube furnaces. For the purposes of the present invention, directly heated rotary tube furnaces are furnaces in which the heat is generated in the furnace tube or hot flue gas is fed directly into the interior of the furnace tube. Here, it is possible to use, for example, a burner flame at the bottom end of the rotary tube furnace so that heat transfer by radiation and by convection predominates, depending on the tube section. Directly heated rotary tube furnaces are generally provided with masonry linings for thermal insulation on the interior wall of the tube. The masonry lining is usually some centimeters thick (10-50 cm). The outer tube wall usually consists of steel. However, directly heated rotary tube furnaces come into consideration only for reactions in which the flue gases are inert in respect of the reactions to be carried out in the rotary tube furnace or in which the reaction of flue gas components with the feed material does not have an adverse effect on the product properties.

In the case of indirectly heated rotary tube furnaces, the heat is introduced through the tube wall. Heating can, for example, be carried out electrically, by means of natural gas burners or by means of steam. In most applications, the tube consists of a heat-resistant steel or an appropriate nonferrous alloy, e.g. a nickel-based alloy. In special applications, e.g. at temperatures of >1200° C. or in the case of highly corrosive feed material, ceramic tubes are used.

Indirectly heated rotary tube furnaces which are provided with devices such as lifting blades or other internals in the interior of the tube, which internals are arranged essentially parallel to the axis of rotation, are frequently used. In this way, optimal mixing of the mixture is promoted, reactions of the mixture with the gas phase are assisted and the formation of agglomerates is countered.

For some applications, metallic tubes are enveloped in further materials, e.g. ceramic matrix composites or ceramic fibers. This serves for thermal insulation in processes in which the heat is introduced at the end face into the tube or is generated directly in the tube. DE 102006038713 and DE 102012219870 disclose a pressure-resistant body consisting of a main element composed of steel and at least one layer of ceramic fiber composite material which encloses the main element on the outside. In these examples, the fiber composite layer acts as insulation and heat flow from the outside inwards, i.e. indirect heating is not possible. There is no indication of a multilayer structure having a ceramic inner tube or an inner tube composed of ceramic matrix composite. CN203927100 discloses a metallic tube enveloped in ceramic fibers. These ceramic fibers are not a composite composed of a ceramic matrix in which ceramic fibers are embedded. U.S. Pat. No. 4,932,863 likewise discloses a thermally conductive, usually metallic, main element which is encased in insulating ceramic fibers.

A composite material is also described in US 2015/078505; there, a gastight, two-layer composite tube composed of silicon carbide for final storage of nuclear fuels, which comprises an impermeable monolithic SiC layer and a porous SiC-SiC ceramic matrix composite layer. Use as indirectly heated tube is not disclosed.

Furthermore, for reactions whose reaction mixtures have a strong tendency to cake on and/or cake together, rotary tube furnaces are preferably equipped with knockers in order to avoid caking onto the interior wall of the tube. In the case of caking, there is a risk that the caked-on material will no longer mix with the other pulverulent material and the product will thus be inhomogeneous and unusable. Furthermore, the tube can become blocked so that, in continuous operation, the incoming material banks up at the top (inlet) and overflows.

It has recently been found that attack on the material and thus contamination of the product and also wear of the tube can occur in the thermal treatment of corrosive solids in rotary tube furnaces having tubes composed of metal alloys (WO 2016/083185). At high temperatures, softening of the alloy surface and thus erosion of material and product contamination are possible even in the case of solids without corrosive properties.

For this reason, some materials cannot be thermally treated in metallic tubes because of their corrosivity, e.g. because contamination of the product by tube constituents is not acceptable. Typical contaminants are Ni and Cr (see Praxishandbuch Thermoprozesstechnik, volume II: Anlagen, Komponenten, Sicherheit, 2nd edition, 2011, page 575, section "Metallische Rohre"). Often, directly heated, masonry-lined rotary tube furnaces likewise do not come into question, e.g. because of the lower precision of temperature control or the atmosphere in the tube which is determined by the flue gas and cannot be selected freely. Indirectly heated rotary tube furnaces having tubes composed of conventional ceramic have, in addition to the abovementioned problems, the further problem that it is not possible to use knockers since monolithic ceramics do not have sufficient mechanical shock resistance and the use of knockers would thus lead to fracture.

For materials in the case of which a metallic tube and a directly heated rotary tube furnace cannot be used for the thermal treatment thereof, recourse has to be made to an indirectly heated rotary tube furnace having a ceramic tube. If the use of knockers is additionally required or the desired solids throughput cannot be achieved (economically) using the ceramic tubes having limited dimensions, rotary tube furnace technology has hitherto not been suitable for the thermal treatment of the material. In this case, recourse then has to be made to another, more expensive furnace technology.

One alternative furnace technology of this type is, for example, the through-passage furnace (tunnel kiln) process, e.g. using roller hearth furnaces, pusher furnaces or belt furnaces. In this process, the material is introduced into a firing capsule and then moved through a heating zone. This process minimizes the corrosion problems when ceramic firing capsules are used. However, roller furnaces have the disadvantage that the size of the firing boxes is limited and that during the heating procedure they absorb heat which cannot be recovered. In addition, the use of ceramic firing aids limits the heating and cooling rates to, in general, 1-3 K/min since ceramic firing aids are not resistant to thermal shock. This results in a high energy consumption and long cycle times due to the heating and cooling. Since in the case of bulk materials, sometimes increased further by sintered crusts which occur, diffusion of the reaction gas is greatly hindered the bed height is restricted to a few centimeters and the hold time is very long. The advantage of roller hearth furnaces is the insensitivity thereof to dust formation and stickiness or softening of the material being calcined. Furthermore, roller hearth furnaces can be used very flexibly and allow frequent product changes since crosscontamination is ruled out and no start-up and shutdown losses arise.

An example of the starting materials having high purity requirements (electronic grade) are phosphor products for LEDs, which go through a calcination process at about 1600° C. At present, the calcination is carried out in a through-passage furnace (tunnel kiln).

Another example of starting materials having high purity requirements are lithium-comprising transition metal oxides and lithium-iron phosphates which are used as electrode materials for lithium batteries.

Most of these research activities are concerned with the materials as such (see, for example, U.S. Pat. No. 8,992,794 B2, U.S. Pat. No. 8,377,412 B2, U.S. Pat. No. 8,980,475 B2, WO14180686 A1 or EP 2 351 139 B1). However, the influence of the thermal treatment steps on the properties of the respective electrode material and the costs of the production process must not be underestimated.

WO 2012/177833 describes the thermal treatment of an oxide cathode material in a cascade of two furnaces having different temperatures, with the first preferably being a metallic rotary tube furnace and the second being a rotary tube furnace or a roller hearth furnace. However, the problem of possible corrosion, especially in a possibly second rotary tube furnace at temperatures above 900° C., remains unsolved.

EP 2 696 406 A likewise describes a two-stage thermal treatment, with a treatment in a rotary tube furnace preceding the treatment in a container (firing capsule). Materials proposed for the rotary tube furnace are ones which have excellent heat conduction, e.g. nickel, titanium or stainless steel or else ceramic. Temperatures indicated are from 700 to 1100° C. In the example disclosed in EP 2 696 406 A, a double-walled rotary tube furnace whose walls have excellent heat conduction is used. In this disclosure, too, the problem of possible corrosion is not considered.

Accordingly, the inexpensive rotary tube furnace technology has hitherto been unsuitable for the thermal treatment of materials having a very high purity requirement and corrosive properties. In the case of these materials recourse has to be made to other furnace technologies. Industrially, these electrode materials for lithium ion batteries, for example, are at present produced in roller hearth furnaces.

It is therefore an object of the present invention to configure the high-temperature treatment at temperatures of from 500° C. to 1600° C. of materials, in particular of corrosive materials such as alkaline cathode materials for lithium ion batteries, where high product purity is required, in an advantageous way. Furthermore, owing to the cohesiveness of some materials at high temperatures, the use of knockers is necessary, which rules out use of conventional ceramic materials. Metallic materials can, depending on the material, lead to significant contamination of the product with alloy elements, in particular chromium, even starting from ambient temperature. At high temperatures, softening of the alloy surface and thus erosion of material and product contamination is also possible even in the case of solids without corrosive properties.

It was accordingly an object of the present invention to provide a reactor system which is suitable, at temperatures of greater than 500° C., for thermally treating materials which are corrosive in respect of the selected material, atmosphere and the thermodynamic parameters and/or tend to cake on and cake together, in high purity, e.g. impurities in the range of <10 ppm, and high homogeneity, e.g. fluctuation in the crystallite size of <20%, by means of indirect heating.

It has surprisingly been found that a heat-permeable tube for the thermal treatment of materials which are corrosive and/or tend to cake on and cake together is suitable for achieving the stated object, wherein the tube has an at least double-walled structure and the material of the interior wall comprises ceramic matrix composite and the material of the exterior wall comprises metal and the at least double-walled tube wall has a ratio of thermal conductivity and wall thickness (heat transfer coefficient) at 800° C. of >50 $W/(m^2 \cdot K)$.

Furthermore, the present invention encompasses the use of ceramic matrix composite materials as tube material in indirectly heated rotary tube furnaces, optionally also as single-walled tube, preferably as double-walled tube.

Furthermore, the present invention encompasses a rotary tube which has an at least double-walled structure, wherein the material of at least one wall comprises a ceramic matrix composite and the material of at least one other wall comprises metal.

The present invention advantageously enables contamination of the product to be thermally treated with alloy constituents of metal tubes to be completely avoided, i.e. at least less than 10 ppm, within measurement accuracy. Furthermore, the present invention makes it possible to employ knockers in order to avoid caked-on product on the tube.

Hitherto, ceramic matrix composites have been used in tubes exclusively as outer insulation layer, e.g. U.S. Pat. No. 6,733,907.

The at least double-walled tube wall according to the invention, also referred to as "tube wall according to the invention" for short, has a ratio of thermal conductivity and wall thickness (heat transfer coefficient) at 800° C. of advantageously >20 $W/(m^2 \cdot K)$, preferably >30 $W/(m^2*K)$, more preferably >50 $W/(m^2*K)$, more preferably >100 $W/(m^2*K)$, more preferably >200 $W/(m^2*K)$, more preferably >300 $W/(m^2*K)$, more preferably >500 $W/(m^2*K)$, in particular >1000 $W/(m^2*K)$. This also applies to the tube of the invention and the rotary tube of the invention. The upper limit to the ratio of thermal conductivity and wall thickness (heat transfer coefficient) is at present, for technical reasons, about 5000 $W/(m^2*K)$. The procedure for determining the heat transfer coefficients is known to those skilled in the art (chapter Cb: Wärmedurchgang, VDI-Wärmeatlas, 8th edition, 1997). Corresponding tubes are also referred to as "tubes of the invention" in connection with the present invention.

Tubes of the invention are advantageously gastight in the radial direction. For the purposes of the present invention, the term "gastight" refers to a solid which, in accordance with DIN EN 623-2, has an open porosity of zero. The permissible measurement accuracy is <0.3%.

The tube of the invention can have all geometries known to those skilled in the art, e.g. cylindrical or conical. The cross section can be prismatic, circular or oval. Taper and constrictions are possible, e.g. at the inlet and/or outlet end.

The ceramic matrix composites have a matrix composed of ceramic particles between the ceramic fibers, in particular long fibers, as wound body or as textile. Terms used are fiber-reinforced ceramic, composite ceramic or simply fiber ceramic. Matrix and fibers can in principle consist, independently of one another, of all known ceramic materials, with carbon also being considered to be a ceramic material in this context.

Preferred oxides of the fibers and/or of the matrix are oxides of an element from the group: Be, Mg, Ca, Sr, Ba, rare earths, Ti, Zr, Hf, V, Nb, Ta, Cr, Mo, W, Mn, Fe, Co, Ni, Zn, B, Al, Ga, Si, Ge, Sn, Re, Ru, Os, Ir, In and mixtures of these oxides.

Mixtures are advantageously suitable both as material for the fibers and for the matrix. Fibers and matrix generally do not have to be composed of the same material.

In principle, not only binary but also ternary and higher mixtures are suitable and of importance. The individual constituents can occur in the same molar amounts in a mixture, but mixtures having very different concentrations of the individual constituents of the mixture through to doping, in the case of which a component occurs in concentrations of <1%, are advantageous.

The following mixtures are particularly advantageous: binary and ternary mixtures of aluminum oxide, zirconium dioxide and yttrium oxide (e.g. zirconium dioxide-reinforced aluminum oxide); mixtures of silicon carbide and aluminum oxide; mixtures of aluminum oxide and magnesium oxide (MgO spinel); mixtures of aluminum oxide and silicon dioxide (mullite); mixture of aluminum silicates and magnesium silicates, ternary mixture of aluminum oxide, silicon oxide and magnesium oxide (cordierite); steatite (magnesium silicate); zirconium dioxide-reinforced aluminum oxide; stabilized zirconium dioxide $ZrO_2$: stabilizers in the form of magnesium oxide (MgO), calcium oxide (CaO) or yttrium oxide ($Y_2O_3$); it is optionally also possible to use cerium oxide ($CeO_2$), scandium oxide ($ScO_3$) or ytterbium oxide ($YbO_3$) as stabilizers; also aluminum titanate (stoichiometric mixture of aluminum oxide and titanium oxide); silicon nitride and aluminum oxide (silicon aluminum oxynitride SIALON).

As zirconium dioxide-reinforced aluminum oxide, it is advantageous to use $Al_2O_3$ with from 10 to 20 mol % of $ZrO_2$. In order to stabilize $ZrO_2$, it can be advantageous to use from 10 to 20 mol % of CaO, preferably 16 mol %, from 10 to 20 mol % of MgO, preferably 16 mol %, or from 5 to 10 mol % of $Y_2O_3$, preferably 8 mol % ("fully stabilized zirconium dioxide") or from 1 to 5 mol % of $Y_2O_3$, preferably 4 mol % ("partially stabilized zirconium dioxide"). As ternary mixture, 80% of $Al_2O_3$, 18.4% of $ZrO_2$ and 1.6% of $Y_2O_3$, for example, are advantageous.

In other embodiments of the present invention, fibers composed of basalt, boron nitride, tungsten carbide, aluminum nitride, titanium dioxide, barium titanate, lead zirconate titanate and/or boron carbide are selected.

Possible fibers are advantageously reinforcing fibers which come under the categories of oxidic, carbidic, nitridic fibers or C fibers and SiBCN fibers. Preference is given to fibers of the ceramic composite material selected from among aluminum oxide, mullite, silicon carbide, zirconium dioxide and/or carbon fibers. Mullite consists of mixed crystals of aluminum oxide and silicon dioxide. Preference is given to using fibers composed of oxide ceramic ($Al_2O_3$, $SiO_2$, mullite) or of nonoxide ceramic (C, SiC). Oxidic fibers are preferred.

As matrix, oxidic and carbidic ceramics, in particular aluminum oxide, mullite, silicon carbide, zirconium dioxide and spinel, are advantageous.

It is advantageous to use creep-resistant fibers, i.e. fibers which in the creep region, namely the temperature range up to 1400° C., display no increase or a minimal increase over time of permanent deformation, i.e. creep strain. The 3M company indicates the following limit temperatures for a permanent elongation of 1% after 1000 hours under a tensile load of 70 MPa for NEXTEL fibers: NEXTEL 440: 875° C., NEXTEL 550 and NEXTEL 610: 1010° C., NEXTEL 720: 1120° C. (reference: Nextel™ Ceramic Textiles Technical Notebook, 3M, 2004). Chemically, the fibers are characterized by a high creep strength which is ensured, in particular, under atmospheric air at high operating temperatures.

For the purposes of the present invention, the fibers advantageously have a diameter in the range from 10 to 12 µm. They are advantageously interwoven with one another, usually in linen weave or satin weave, to give textile sheets, knitted to form tubes or wrapped as fiber bundle around a pattern. To produce the ceramic composite system, the fiber bundles or fiber fabrics are, for example, impregnated with a slip comprising the components of the future ceramic matrix, advantageously $Al_2O_3$, zirconium dioxide or mullite, (Schmücker, M. (2007). Faserverstärkte oxidkeramische Werkstoffe. Materialwissenschaft und Werkstofftechnik, 38(9), 698-704). Heat treatment at >700° C. forms a high-strength composite structure composed of the ceramic fibers and the ceramic matrix having a tensile strength of advantageously >50 MPa, preferably >70 MPa, more preferably >100 MPa, in particular >120 MPa.

Preference is given to using SiC/SiC, C/SiC, $ZrO_2$/$ZrO_2$, $ZrO_2$/$Al_2O_3$, $Al_2O_3$/$ZrO_2$, $Al_2O_3$/$Al_2O_3$ and/or mullite/mullite as ceramic matrix composite. Preference is also given to the oxidic ceramic matrix composites SiC/$Al_2O_3$, SiC/mullite, C/$Al_2O_3$, C/mullite, $Al_2O_3$/$Al_2O_3$, $Al_2O_3$/mullite, mullite/$Al_2O_3$ and/or mullite/mullite, with the term "oxidic ceramic matrix composite" referring to a matrix which is composed of oxidic ceramic particles and comprises ceramic, oxidic and/or nonoxidic fibers. Particular preference is accordingly given to systems in which fibers and matrix consist of the same material or materials which behave similarly. Here, the material before the oblique stroke is the fiber type and the material after the oblique stroke is the matrix type. Siloxanes, Si precursors and a variety of oxides, for example zirconium dioxide, can also be used as matrix system for the ceramic fiber composite structure. The ceramic matrix composite preferably comprises at least 99% by weight of $Al_2O_3$ and/or mullite.

In one embodiment of the present invention, the matrix has a degree of fill of fibers (proportion by volume of the fibers in the composite structure) of from 20 to 40%; the total solids content of the composite structure is in the range from 50 to 80%. Ceramic matrix composites based on oxidic ceramic fibers are chemically stable in an oxidizing gas atmosphere and in a reducing gas atmosphere (i.e. no weight change after storage in air at 1200° C. for 15 hours (reference: Nextel™ Ceramic Textiles Technical Notebook, 3M, 2004)) and thermally stable to above 1300° C. Ceramic matrix composites have a pseudoductile deformation behavior. Thus, they are resistant to temperature changes and have a pseudotough fracture behavior. The failure of a component is thus apparent before it fractures.

The ceramic matrix composite preferably has a porosity of from 20% to 50%; it is accordingly not gastight according to the definition in DIN 623-2.

The system is particularly preferably aluminum oxide fibers-aluminum oxide matrix, in particular when used in the calcination process for NCM electrode material, see examples.

A person skilled in the art can optimize the fiber-matrix system which is preferred in the particular case on the basis of the reactions to be carried out in the inventive tube concerned, taking into account the impurities which are in each case permissible in the end product.

As metal, it is advantageous to use an alloy, e.g. steels of the grade 1.47xx or 1.48xx, or nickel-based alloys of the grade 2.48xx, preferably 1.48xxx.

The total wall of the tube of the invention advantageously consists of two or more walls. Further walls can be present on the inside, the outside and/or between the specified walls; for example, protective layers against abrasion, damping layers to compensate for different thermal expansions of the materials, electrical insulation layers, sealing layers, heating layers (electric heating) or hollow layers through which inert gases, e.g. nitrogen or argon can be passed or through which steam can flow in order to heat the interior space.

In the case of a tube according to the invention having more than two walls, the intermediate wall between outer metal tube and inner ceramic matrix composite tube can, for example, consist of expanded graphite or graphite foil, e.g. Sigraflex® (SGL Carbon) in order to absorb different thermal expansions of the materials.

Furthermore, in the case of a tube according to the invention having more than two walls, one tube can, for example, be used as resistance heating. This tube can, for example, be present between metallic outer tube and ceramic matrix composite inner tube.

In the case of a tube according to the invention having four walls, a combination of the two preceding examples, for example, is possible, with the positions of the graphite layer and of the resistance heating being variable.

Furthermore, a tube according to the invention having three or more walls, in which one of the inner two walls or one of the inner three or one of the inner four walls is a resistance heating tube and the outermost wall is a thermal or electrical insulation layer or a both thermal and electrical insulation layer, with the thermal insulation layer being able to consist of a plurality of individual layers which can here be considered to be one wall on the basis of their function, is advantageous.

In the combination of the ceramic matrix composite with a metallic material, the wall thickness of the ceramic matrix composite is advantageously in the range from 1 mm to 10 mm, preferably from 1.5 to 6 mm, in particular from 2 mm to 6 mm; the wall thickness of the metallic material is advantageously in the range from 2 to 30 mm, preferably from 2.5 to 25 mm, in particular from 3 to 15 mm, at a tube internal diameter in the range from 100 to 500 mm.

The thermal conductivity of the ceramic matrix composite is advantageously from 0.4 W/m·K to 8 W/m·K at 200° C. or from 0.3 to 5 W/m·K at 1000° C.

The thermal conductivity of the metal alloy is advantageously from 10 to 25 W/m·K at 200° C. or from 15 to 35 W/m·K at 1000° C.

In the case of a tube internal diameter of from 500 to 1200 mm and the combination of the ceramic matrix composite with a metallic material, the wall thickness of the ceramic matrix composite is advantageously in the range from 2 mm to 15 mm, preferably from 2.5 to 10 mm, in particular from 4 mm to 8 mm; the wall thickness of the metallic material is advantageously in the range from 3 mm to 40 mm, preferably from 5 mm to 30 mm, in particular from 6 mm to 25 mm.

In the case of tubes according to the invention having a greater internal diameter, a greater wall thickness can be useful.

The length and the diameter of a rotary tube furnace are designed according to the required throughput of material and the required residence time of the material in the tube in order to achieve the desired product properties.

Indirectly heated rotary tube furnaces usually have a ratio of length to diameter in the range from 5 to 20, preferably from 6 to 12. However, there are also rotary tube furnaces which deviate greatly therefrom, in particular rotary tube furnaces operated batchwise. The tube length of indirectly heated rotary tube furnaces is generally in the range from 1 to 20 m, with from 0.5 m to 20 m thereof being heated. There are rotary tubes in the case of which only a small part of the total length is heated (<50%), with the remainder of the length serving as drying or preheating zone or as cooling zone and active cooling, e.g. by supplying cooling water to the outer tube wall, being possible. The internal diameters of these indirectly heated rotary tube furnaces are usually in the range from 50 to 1500 mm, with tubes having an internal diameter of >100 mm, mostly >250 mm, usually being used on a production scale.

The sealing of the tube of the invention, e.g. when used in a rotary tube furnace, is advantageously effected via the outer tube. The inner tube comprising a ceramic matrix composite is advantageously inserted into the metallic outer tube in such a way that advantageously no solid, i.e. advantageously less than 0.1% of the solid based on the initial mass flow, can get between the tubes, or that advantageously no solid can exit again from the intermediate space.

The at least two walls of the tube of the invention can, for example, be joined by means of ceramic adhesives or metal-ceramic soldering or welding points. The use of metallic sheaths which are shrunk on is also possible. Here, the different coefficients of thermal expansion of the materials have to be taken into account. The coefficient of thermal expansion of metal alloys is generally about twice as great as that of the fiber ceramic composite material, which is in the range $4.3$-$8.4*10^{-6}$/K (Whipox®).

This means that, in the production of tubes according to the invention, the inner tube is, for example, advantageously inserted into the preheated outer tube, so that in the cold state an accurately fitting surface pairing is advantageously present. In the hot state, there would then advantageously be play between inner tube and outer tube.

As an alternative, a slight spacing of, for example, from 1 to 20 mm, preferably from 2 to 10 mm, in particular from 2 to 6 mm (difference between internal diameter of outer tube and external diameter of inner tube) can be provided between inner tube and outer tube, even in the cold state (FIG. 1). The spacing can be maintained by means of springs, e.g. composed of ceramic fiber mats/fabrics, graphite or else fiber ceramic composite materials. At the end faces, the gap (FIG. 1) between inner tube and outer tube end face is advantageously sealed by means of a suitable material (loose-loose mounting). The inner tube can also be joined in a fixed manner at an end face to the outer tube, so that there is a gap only on one side (fixed-loose mounting). The tubes are not necessarily arranged coaxially, but this is advantageous for mechanical reasons (stressing of the mounting).

The sealing of the two ends or of one end of the composite tube can be carried out in a variety of ways.

For example, a seal can be achieved by impregnation or coating of the outer wall or of the inner wall with a polymer, an advantageously nonporous ceramic, pyrolytic carbon and/or a metal. The sealed regions serve as sealing surfaces. This variant can be used up to a temperature range of <400° C. The tube is advantageously coated only in the peripheral region toward the metallic connecting piece. "Peripheral region" means the last section before the transition to another material, preferably having a length corresponding to from 0.05 to 10 times the internal diameter of the tube, preferably corresponding to from 0.1 to 5 times the internal diameter, in particular corresponding to 0.2 to 2 times the internal diameter. The thickness of the impregnation advantageously corresponds to the total wall thickness of the tube in the peripheral region. Impregnation methods are known to those skilled in the art.

This multiwall tube, preferably double-walled tube, is used, for example, as rotary tube in rotary tube furnaces. A rotary tube furnace is a furnace in which the bulk material to be treated is agitated by itself.

As an alternative, the tube of the invention can be used in a vertical calcination furnace in which the tube is mounted statically and heated from the outside and the material being calcined travels from the top downward through the tube. The vertical calcination furnace can be configured either as downflow reactor or as "moving fixed bed".

The multiwall tube can also be used for drum or rotary tube dryers or as cooling tube.

The present invention also encompasses a rotary tube furnace comprising a rotary tube according to the invention.

The present invention preferably provides a rotary tube furnace comprising a rotary tube which has an at least double-walled construction, wherein the material of the at least one wall comprises a ceramic matrix composite and the material of the at least one other wall comprises ceramic or metal.

Thermal treatments (calcination) of material are typically carried out in a rotary tube furnace. In particular, the rotary tube of the invention is suitable for thermal treatments at high temperatures, in particular at temperatures of the material being calcined in the range from 300 to 1800° C., preferably from 400 to 1600° C., in particular from 500 to 1300° C.

The combination of ceramic matrix composite, in particular as inner wall, and the metallic material, in particular as outer wall, is advantageous at temperatures in the range from 300 to 1300° C., preferably from 500 to 1200° C., in particular from 600 to 1100° C.

The rotary tube of the invention is preferably indirectly heated. The introduction of heat advantageously occurs from outside both through the metal tube and through the ceramic matrix composite tube into the material present in the tube. All indirect heating methods known to those skilled in the art can be used. Heating can be effected, for example, electrically, by means of natural gas burners or by means of steam.

The general structure of a rotary tube is known to those skilled in the art, for example from "Rotary Kilns" by A. A. Boateng, "Chemiemaschinen. Zentrifugen-Filter-Drehrohröfen" by Kantorowitsch or Praxishandbuch Thermoprozesstechnik, volume II: Anlagen, Komponenten, Sicherheit. 2nd edition, 2011, pp. 571-579.

Rotary tube furnaces are typically continuously operated furnaces for the thermal treatment of solids which can be present as powder or shaped bodies. The furnaces are usually operated with a small inclination of a few degrees, typically from 0 to 5°, in order to bring about axial transport of solids by means of the rotation about the axis of the tube, for example with an Fr number in the range from $10^{-5}$ to 0.9. However, there are also batch rotary tube furnaces and rotary tube furnaces having no inclination or a negative inclination, and also rotary tube furnaces in which transport of solids is brought about mainly by internals (helix or feed screw).

Rotary tube furnaces are usually operated with gas flowing through them; in the case of continuously operated furnaces, the gas flow can occur in cocurrent or countercurrent to the flow of solids. The flow velocity of the gas is typically in the range from 0 to 1 m/s. The atmosphere can be reactive, inert, oxidizing or reducing. The residence time of the solid in the rotary tube furnace is usually from some minutes to a few hours (from 10 to 240 min), but can, particularly in the case of directly heated rotary tube furnaces, also be significantly higher.

All knockers known to those skilled in the art, see "Rotary Kilns" by A. A. Boateng, can be used in the rotary tube of the invention. Knockers are usually installed at the top (solids inlet end) and bottom (solids outlet end) of the rotary tube furnace on the outside of the tube. A plurality of knockers or lifting devices for a mechanical knocker (hammer) which is fixed in position can be installed along the circumference of the tube. Pneumatic knockers can be installed not only in the top and bottom positions but also along the tube. For this purpose, the heating jacket is advantageously interrupted in the region of the ram.

The rotary tube furnace of the invention is particularly suitable for the thermal treatment of materials, e.g. particulate solids or bulk materials in the form of powders, fragments, agglomerates, shaped bodies such as pellets or extrudates.

Furthermore, the rotary tube furnace is suitable for oxidation, reduction, surface treatment (e.g. thermal nitriding), phase formation, (re)crystallization, drying, decomposition, incineration, pyrolysis, gasification and also syntheses of all types.

The rotary tube furnace of the invention is also suitable for use in processes having a plurality of thermal treatment steps. In these processes, one or more thermal treatments can advantageously be carried out in the rotary tube of the invention, with the other thermal treatments being carried out in other reactors, e.g. tunnel kilns. Thus, for example, a combination of dissociation reaction and recrystallization or tempering step can be carried out as follows: dissociation reaction such as the decomposition of carbonate or nitrate salts to form the corresponding oxide and carbon dioxide or corresponding nitrogen oxides in the rotary tube furnace and recrystallization or tempering step in a downstream tunnel kiln.

The rotary tube furnace, in which the material being calcined is mixed, is characterized by better heat and mass transfer in the material being calcined. This has a favorable effect on the reaction to be carried out. The required residence time in the rotary tube furnace is shorter than in a tunnel kiln in which the material being calcined is not mixed.

However, some thermal treatment steps cannot be carried out in the rotary tube furnace because of their demands in terms of temperature and/or residence time or because of, for example, cohesive properties of the material being calcined at high temperatures. In such a case, a process with preceding thermal treatment in the rotary tube furnace is advantageous when at least one step of the thermal treatment can be carried out in a rotary tube furnace. This leads to a shortened residence time in the tunnel kiln and thus to a higher production capacity. In addition, higher loadings of the firing aids (crucibles) in the tunnel kiln can often be achieved when a chemical reaction or drying has been able to be carried out in the preceding rotary tube furnace. The combined process using rotary tube furnace and tunnel kiln is found to be particularly advantageous in this case.

Preference is given to thermal treatments of materials which have high purity requirements, in particular freedom from contamination above 50 ppm (volumetric, molar or by mass) by materials which can get into the product during the thermal treatment.

Furthermore, preference is given to thermal treatments of materials which have a strong tendency to cake on, in particular those which lead to formation of deposits on the inner wall of the tube so that at least 50% of the tube circumference on the inside is covered at at least one place along the tube axis.

The rotary tube furnace of the invention can, for example, be used in the calcination of alkaline material, for example in the preparation of lithiated layer oxides of nickel, cobalt and manganese. In this application, the ceramic matrix composite is advantageously made of the system $Al_2O_3/Al_2O_3$.

Depending on the material to be treated, other fiber ceramic composite materials will be preferred.

The tube according to the invention can be used for preparing any lithiated transition metal oxides. The term "lithiated transition metal oxide" encompasses mixed metal oxides comprising lithium and at least one transition metal, but is not restricted thereto. Advantageously lithiated transition metal oxides are those of nickel, cobalt, manganese and combinations of at least two of these. The stoichiometric ratio between lithium and the total transition metals is preferably in the range from 1.13:0.87 to 1:2. Lithiated transition metal oxide can comprise up to 5 mol % of Al, based on the total transition metal content.

Preferred lithiated transition metal oxides are lithiated spinels and lithiated transition metal oxides having a layer structure.

Preferred lithiated transition metal oxides are selected from the group consisting of lithiated spinels, lithiated Ni-Co-Al oxides and lithiated transition metal oxides having a layer structure.

Examples of lithiated transition metal oxides are $LiCoO_2$, $LiMnO_2$, $LiNiO_2$ and compounds of the general formula $Li_{1+x}(Ni_aCo_bMn_cM^1_d)_{1-x}O_2$, where $M^1$ is selected from the group consisting of Ca, Al, Ti, Zr, Zn, Mo, V and Fe and the further variables are advantageously defined as follows:

x in the range from 0.015 to 0.13,
a in the range from 0.3 to 0.7,
b in the range from 0 to 0.35,
c in the range from 0.2 to 0.5,
d in the range from 0 to 0.03,
where a+b+c+d=1.

In a specific embodiment of the present invention, lithiated transition metal oxides composed of $LiCoO_2$-coated lithiated nickel-cobalt-magnesium oxides, doped or undoped, are chosen; an example is $LiCoO_2$-coated $LiNi_{0.9}Co_{0.09}Mg_{0.01}O_2$. In principle, each of the thermal treatment steps for preparing $LiCoO_2$-coated lithiated nickel-cobalt-magnesium oxides can be carried out in a rotary tube according to the invention.

Further examples of lithiated transition metal oxides are compounds of the general formula $Li_{1+y}(M^2)_{2-y}O_{4-r}$, where r is advantageously in the range from 0 to 0.4 and y is advantageously in the range from 0 to 0.4; $M^2$ is selected from among one or more metals of groups 3 to 12 of the Periodic Table, for example Ti, V, Cr, Mn, Fe, Co, Ni, Zn, Mo, with Mn, Co and Ni and combinations thereof being preferred. Particular preference is given to combinations of Ni and Mn. Very particular preference is given to $LiMn_2O_4$ and $LiNi_{2-t}Mn_tO_4$, where t is advantageously in the range from 0 to 1.

Examples of Li-Ni-Co-Al oxides are compounds of the general formula $Li(Ni_hCo_iAl_j)O_{2+r}$. Typical values of h, i and j are:

h in the range from 0.8 to 0.85,
i in the range from 0.15 to 0.20,
j in the range from 0.01 to 0.05,
r in the range from 0 to 0.4.

The process for preparing the abovementioned lithiated transition metal oxides comprises three steps, hereinafter referred to as step (a), step (b) and step (c):

(a) mixing of at least one lithium salt and a precursor selected from the group consisting of transition metal oxides, transition metal oxyhydroxides, transition metal hydroxides and transition metal carbonates, with transition metal hydroxides and transition metal oxyhydroxides being preferred, (b) precalcination of the mixture obtained in step (a) at a temperature in the range from 300 to 700° C. and (c) calcination of the precalcined mixture from step (b) at a temperature in the range from 550° C. to 950° C.

One or both of the steps (b) and (c) can be carried out in the tube of the invention. It is also possible for the two steps (b) and (c) to be carried out together in only a single tube according to the present invention.

In the application described here, the chemical resistance of the tubes of the invention, in particular toward corrosive media at high temperatures, is of great importance. Compared to the use of single-walled monolithic ceramics, ceramic matrix composite offers two critical advantages: firstly, the better availability of components in the required dimensions, in particular large diameters and lengths; secondly, ceramic matrix composite is mechanically pseudo-ductile, which allows the use of knockers. Fiber ceramic tubes can be made with sufficiently thin walls, so that indirect introduction of heat through the tube wall is possible despite the double-walled structure.

The advantages of oxidic ceramic matrix composites are in summary: the high heat resistance, the high elastic yield point of ceramic fibers (about 1%) and pseudoductile deformation and fracture behavior. In addition, tubes having a greater diameter and greater length than is possible when using pure ceramic materials can be manufactured and used because of the insensitivity of fiber ceramic composite materials to thermal gradients and thermal shocks.

EXAMPLES

Figure 1:
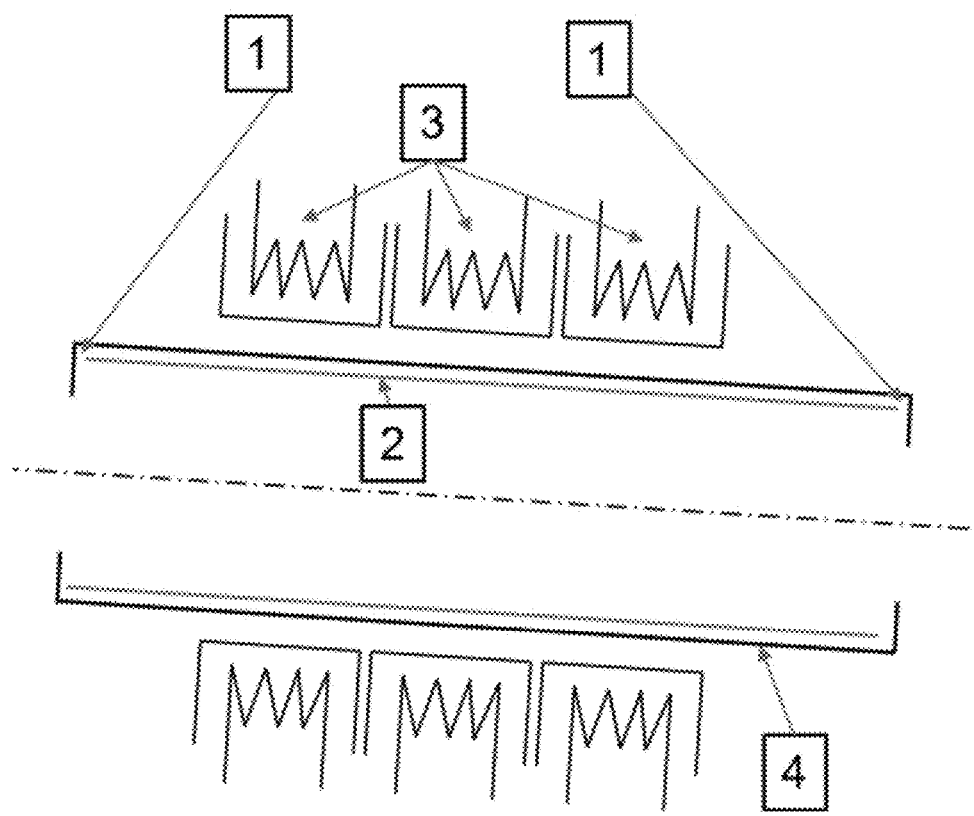
FIG. 1 is a schematic depiction of an indirectly heated rotary tube furnace having three heating zones [3] in cross section viewed from the side. The axis of rotation is shown as a dash-dot line. The tube circumferences [1] to be sealed at the end face of the inner tube [2], which in this depiction is somewhat shorter than the outer tube [4], are indicated. The outer tube [4] has overflow weirs at the inlet and outlet in this illustrative figure; these are optional.
Figure 2:
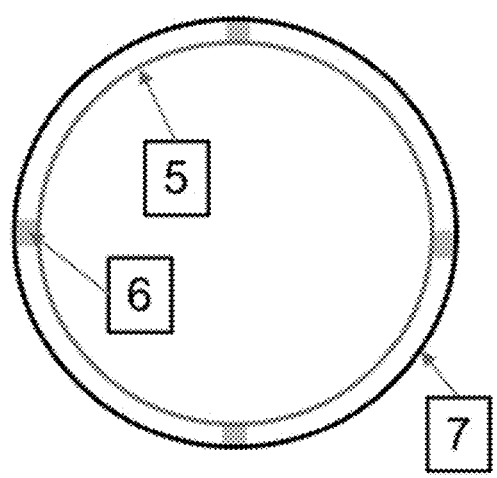
FIG. 2 shows the double-walled tube viewed from the end face. In this illustrative, schematic depiction which is not true to scale, the inner tube [5] is held in position in the outer tube [7] by four springs [6] located at an angle of 90° relative to one another. The springs serve to compensate for different thermal expansions of inner and outer tube.

Gas volumes are reported in standard cubic meters, i.e. at 1 bar and 20° C. in accordance with ISO 6358/ISO 8778.

I. Production of a Mixture

A dry mixture of $Li_2CO_3$ with MO(OH) precursor particles, M=Ni, Co and Mn in a molar ratio of 1:1:1, average particle diameter 10 μm, was produced. The mass ratio of $Li_2CO_3$ to MO(OH) was 1:2. A mixture was obtained.

II. Calcination Experiments

Comparative experiments: Calcination of NCM cathode materials in a metal tube. NCM cathode materials are corrosive and during the thermal treatment in a rotary tube at high temperatures above about 700° C. tend to adhere strongly to the tube wall. This makes the use of auxiliaries such as knockers or scrapers necessary. Without use of such auxiliaries, the interior wall of the tube becomes completely covered with caked-on material.

II.1: Continuous Calcination at 675° C.

II.1.1: Use of a Tube Composed of a Nickel-Based Alloy

The mixture from I. was fed via a feed screw into a rotary tube furnace from "Linn High Therm" (tube length 2 m, of which 1 m was heated in three zones, internal tube diameter 100 mm, no internals) having a tube composed of the nickel-based alloy of the grade 2.4851. The feed rate of mixture was set to 1.3 kg/h. The furnace had three heating zones each having a length of 330 mm; in the illustrative case of the thermal treatment in the rotary tube furnace, these were set to 550° C., 675° C. and 675° C. The inclination of the tube was 1°, and the speed of rotation was two revolutions per minute. No knockers were used.

In the thermal treatment, the mixture traveled through an unheated part of the tube having a length of about 400 mm (the end of the feed screw projected about 100 mm into the tube) and was preheated there by convection (gas in countercurrent, coming from the heated region), conduction (thermal conduction in bulk material and metal tube) and radiation. The heating zones were followed by a further unheated section having a length of 500 mm before the material was discharged. The rotary tube furnace was operated in countercurrent; two standard m³/h of air were fed to the solids discharge end.

The chemical reactions which led to product formation proceeded in all zones, including the unheated intake zone and even in the metering/feed screw. This could be confirmed by the partial decomposition of the lithium carbonate into lithium oxide (and $CO_2$) by taking a sample from the feed screw.

II.1.2: Use of a Tube Composed of Steel "SS 330"

The mixture from I. was thermally treated in a rotary tube furnace from the manufacturer "Harper International". A tube which was free of internals and composed of the steel alloy "SS 330" and had a total length of 10 feet (US, corresponding to 3.05 m) and an internal diameter of 10 inches (25.4 cm) was used here. Of the total length, 8 feet are heated in four heating zones each having a length of 2 feet. The temperatures of the heating zones were set to 550° C. (first zone) and 675° C. (zones 2-4).

8.4 kg/h of the mixture from I. were fed to the furnace. The inclination of the tube was set to 1.5°, and the speed of rotation was set to 1.5 revolutions per minute. Ten standard m³/h of air were introduced in countercurrent. Knockers were used.

During the thermal treatment process, chromium from the tube alloy accumulated in the product in both experiments. No contamination of the product by chromium was found in the feed mixture and in the feed screw. The experiments were repeated three times and the averaged analytical values for the chromium concentration are shown in table 1.

TABLE 1

Chromium contamination after calcination at 675° C.

| Position of sampling | Comparative example 1.1 | Comparative example 1.2 |
|---|---|---|
| Feed mixture | <10 ppm | <10 ppm |
| Feed screw | <10 ppm | <10 ppm |
| Furnace outlet | 20 ppm | 30 ppm |

The measurement accuracy for Cr is ±2 ppm.

II.2: Continuous Calcination at 900° C.—Comparative Example

In a manner analogous to experiment II.1.1, a calcination was carried out at 900° C. in the same rotary tube furnace having a tube composed of 2.4851 (nickel-based alloy). 1.2 kg/h of material produced by the process described in example II.1.1 was fed in. The heating zones were each set to 925° C. The inclination of the tube was 2°, and the speed of rotation was two revolutions per minute.

The experiment had to be stopped because of severe caking. The material caked on the tube wall because of its properties: sticky at high temperatures. The product taken out manually displayed contamination as per table 2.

TABLE 2

Chromium and iron contamination (by mass) after calcination at 925° C.

| Position of sampling | Chromium from nickel-based alloy of the grade 2.4851 | Iron from nickel-based alloy of the grade 2.4851 |
|---|---|---|
| Manual sampling after experiment had been stopped | 0.15%/1500 ppm | 0.009%/90 ppm |

The measurement accuracy for Cr and Fe is ±2 ppm.

III.: Batchwise Calcination

III.1: Materials Test/Contamination Test for Aluminum Oxide:

In materials tests, it was shown that aluminum oxide, both in the form of densely sintered or porous ceramic and as ceramic matrix composite ($Al_2O_3/Al_2O_3$) is resistant to the material to be treated.

Ceramic matrix composites based on continuous fibers "3M™ Nextel™ Ceramic Fiber 610" were used. The fibers have a proportion of $Al_2O_3$ of >99%. In addition, the ceramic matrix composites used were based on a ceramic slip having a proportion of >99% of $Al_2O_3$ in the solid. The ceramic matrix composites differed in terms of further properties such as density, porosity, nature of the surface.

The experiments were carried out in a chamber furnace operated batchwise. A sample of the material was brought into contact with mixture from I., heated to 900° C. (at 3 K/min) and, after a hold time of 6 hours, cooled. A temperature change stress is in this way applied in addition to the chemical stress. After cooling, product obtained was replaced by fresh mixture as per I. and the cycle was repeated. The samples withstood more than 30 cycles or 90/100 cycles. 30 cycles are a typical number according to which the suitability of a material can be determined.

In these materials tests, no contamination of the product was detected.

TABLE 3

Chemical resistance of ceramic and ceramic matrix composite

| | Aluminum oxide, densely sintered | Aluminum oxide, porous ceramic | Ceramic matrix composite ($Al_2O_3/Al_2O_3$) |
|---|---|---|---|
| Cycle | >100 | >30 | >90 |
| Contamination by Cr, Fe and Cu | — | — | — |

III.2: Materials Test/Contamination Test for High-Temperature-Resistant Steels and Nickel-Based Alloys:

In a manner analogous to the materials test for aluminum, fresh mixture as per I. was placed on test plates before each cycle. The test plates were plates having dimensions of 100×100 mm with thicknesses of from 2 to 3 mm.

In the comparative tests using high-temperature-resistant steels of the grade 1.4845 and nickel-based alloys of the grade 2.4856, contamination by Cr and Fe as per table 4 was detected in the tests carried out in the same way with maximum temperatures of 900° C. or 700° C. Even after the 5th cycle, renewed contamination occurred; stabilization could not be detected. The test series at 900° C. was stopped after the 5th cycle because of the tremendously high contamination of the product.

TABLE 4

Contamination by metallic materials

| | Contamination after one cycle | | | |
|---|---|---|---|---|
| | 900° C. | | 700° C. | |
| Material | 2.4856 NiCr22Mo9Nb | 1.4845 X8CrNi25-21 | 2.4856 NiCr22Mo9Nb | 1.4845 X8CrNi25-21 |
| Cr | 2100 | 14400 | 5 | 583 |
| Fe | 320 | 300 | 3 | 5 |
| | Contamination after five cycles | | | |
| | 900° C. | | 700° C. | |
| Material | 2.4856 NiCr22Mo9Nb | 1.4845 X8CrNi25-21 | 2.4856 NiCr22Mo9Nb | 1.4845 X8CrNi25-21 |
| Cr | 2400 | 2500 | <1 | 229 |
| Fe | 300 | 1500 | 3 | 37 |
| | Contamination after ten cycles | | | |
| | | 700° C. | | |
| Material | | 2.4856 NiCr22Mo9Nb | 1.4845 X8CrNi25-21 | |
| Cr | | 31 | 251 | |
| Fe | | 10 | 7 | |

Experiment III.3 Calcination in a Tube Reactor According to the Invention

Putting together a rotary tube reactor having an inner wall composed of ceramic matrix composite, $Al_2O_3/Al_2O_3$, outer wall composed of steel SS 330 results in a rotary tube furnace according to the invention with ratio of thermal conductivity and wall thickness (heat transfer coefficient) at 800° C. of >50 W/(m$^2$·K) but less than 5000 W/(m$^2$·K). The inclination of the tube can be set to 1.5°. When 8.4 kg/h of the mixture from I. is introduced into the rotary tube furnace according to the invention and is calcined at 675° C. and a speed of rotation of 1.5 revolutions per minute and an air input of 10 standard m$^3$/h of air in countercurrent, it is found that the resulting cathode material has lower contamination with Fe and Cr than a cathode material produced as per II.1.2. The joined tube allows the use of knockers to prevent caking on the tube wall.

The invention claimed is:

1. A tube of an at least double-walled construction, comprising:
   an interior wall and
   an exterior wall,
   wherein
   an interior wall material comprises ceramic matrix composite,
   an exterior wall material comprises metal,
   the tube has an internal tube diameter ranging from 100 mm to 500 mm,
   a wall thickness of the ceramic matrix composite ranges from 1.5 mm to 10 mm, and
   the at least double-walled tube wall has a heat transfer coefficient at 800° C. of >50 W/(m$^2$·K).

2. The tube according to claim 1, wherein fibers and/or matrix of the ceramic matrix composite comprise at least one oxide of an element selected from the group consisting of: Be, Mg, Ca, Sr, Ba, a rare earth element, Ti, Zr, Hf, V, Nb, Ta, Cr, Mo, W, Mn, Fe, Co, Ni, Zn, B, Al, Ga, Si, Ge, Sn, Re, Ru, Os, Ir, and In.

3. The tube according to claim 1, wherein the ceramic matrix composite comprises a fiber/matrix combination selected from the group consisting of SiC/SiC, C/SiC, $ZrO_2/ZrO_2$, $ZrO_2/Al_2O_3$, $Al_2O_3/ZrO_2$, $Al_2O_3/Al_2O_3$, and mullite/mullite.

4. The tube according to claim 1, wherein the wall thickness of the ceramic matrix composite ranges from 2 mm to 10 mm and a wall thickness of the metal ranges from 2 nm to 30 mm.

5. The tube according to claim 1, wherein, at an internal diameter of from 200 mm to 500 mm, a total wall thickness is from 2 mm to 100 mm, with a thickness of the interior wall being less than 90% of the total wall thickness.

6. The tube according to claim 1, further comprising:
   at least one other wall selected from the group consisting of a protective layer against abrasion, a damping layer, an electrical insulation layer, a sealing layer, a heating layer, and a hollow layer on the outside.

7. The tube according to claim 1, wherein fibers in the ceramic matrix composite have a diameter ranging from 10-12 μm.

8. The tube according to claim 1, wherein fibers in the ceramic matrix composite are interwoven with one another.

9. The tube according to claim 1, wherein matrix in the ceramic matrix composite has a degree of fill of fibers by volume of from 20% to 40%.

10. The tube according to claim 1, wherein the ceramic matrix composite has a porosity of from 20% to 50%.

11. The tube according to claim 1, wherein the ceramic matrix composite has a thermal conductivity of from 0.4 W/m·K to 8 W/m·K at 200° C. or from 0.3 W/m·K to 5 W/m·K at 1000° C.

12. The tube according to claim 1, wherein the metal has a thermal conductivity of from 10 W/m·K to 25 W/m·K at 200° C. or from 15 W/m·K to 35 W/m·K at 1000° C.

13. A rotary tube furnace, comprising the tube according to claim 1.

14. A method for calcinating an alkaline material, the method comprising:

calcinating the alkaline material in the rotary tube furnace according to claim 13.

\* \* \* \* \*